(12) United States Patent
Park et al.

(10) Patent No.: US 11,080,865 B2
(45) Date of Patent: Aug. 3, 2021

(54) HEATMAP PROVIDING APPARATUS AND METHOD

(71) Applicant: HANWHA TECHWIN CO., LTD., Seongnam-si (KR)

(72) Inventors: Joon Young Park, Changwon-si (KR); Seung In Noh, Changwon-si (KR)

(73) Assignee: Hanwha Techwin Co., Ltd., Seongnam-si (KR)

( * ) Notice: Subject to any disclaimer, the term of this patent is extended or adjusted under 35 U.S.C. 154(b) by 0 days.

(21) Appl. No.: 16/364,326

(22) Filed: Mar. 26, 2019

(65) Prior Publication Data

US 2019/0220985 A1 Jul. 18, 2019

Related U.S. Application Data

(63) Continuation-in-part of application No. 14/259,620, filed on Apr. 23, 2014, now abandoned.

(30) Foreign Application Priority Data

Jan. 2, 2014 (KR) ........................ 10-2014-0000407

(51) Int. Cl.
| | | |
|---|---|---|
| G06T 7/246 | (2017.01) | |
| G06K 9/32 | (2006.01) | |
| G06T 7/90 | (2017.01) | |
| G06T 7/20 | (2017.01) | |
| G06T 11/00 | (2006.01) | |
| G06K 9/00 | (2006.01) | |

(52) U.S. Cl.
CPC ............ *G06T 7/248* (2017.01); *G06K 9/3233* (2013.01); *G06T 7/20* (2013.01); *G06T 7/90* (2017.01); *G06T 11/001* (2013.01); *G06K 9/00335* (2013.01); *G06T 2207/20021* (2013.01); *G06T 2207/20104* (2013.01)

(58) Field of Classification Search
None
See application file for complete search history.

(56) References Cited

U.S. PATENT DOCUMENTS

| | | | | |
|---|---|---|---|---|
| 8,345,101 | B2 * | 1/2013 | Bobbitt | ................ G06K 9/3233 348/143 |
| 8,885,706 | B2 * | 11/2014 | Bankoski | ............. H04N 19/124 375/240.03 |
| 2008/0297587 | A1 * | 12/2008 | Kurtz | ....................... H04N 7/15 348/14.08 |
| 2010/0013931 | A1 | 1/2010 | Golan et al. | |

(Continued)

OTHER PUBLICATIONS

Ameya Deoras, Customizable Heat Maps—Jun. 22, 2013 , MatLabCentrall (Year: 2013).*

(Continued)

*Primary Examiner* — YuJang Tswei
(74) *Attorney, Agent, or Firm* — McLean IP Global; Jason Y. Pahng

(57) ABSTRACT

Provided is a heatmap providing apparatus and method in which a heatmap is generated and displayed for an area of interest set in a full region. The heatmap providing method includes: obtaining motion occurrence frequencies in a captured region; setting at least one area of interest in the captured region; and displaying the motion occurrence frequencies in different indications in the area of interest.

20 Claims, 9 Drawing Sheets

(56) References Cited

U.S. PATENT DOCUMENTS

| | | | |
|---|---|---|---|
| 2010/0245563 A1* | 9/2010 | Golovchinsky | H04N 7/18 |
| | | | 348/135 |
| 2011/0047155 A1* | 2/2011 | Sohn | H04N 19/186 |
| | | | 707/736 |
| 2012/0162454 A1* | 6/2012 | Park | G06T 7/238 |
| | | | 348/208.6 |
| 2012/0262472 A1 | 10/2012 | Garr et al. | |
| 2013/0325326 A1 | 12/2013 | Blumenberg et al. | |
| 2013/0328921 A1 | 12/2013 | Kuppusamy | |
| 2014/0172489 A1* | 6/2014 | Goulart | G06Q 10/06312 |
| | | | 705/7.22 |

OTHER PUBLICATIONS

KR Office Action dated Feb. 12, 2020 for KR application No. 10-2014-0000407.

* cited by examiner

FIG. 2

| 10 | 0  | 12 | 0  | 12 | 25 | 25 | 12 |
|----|----|----|----|----|----|----|----|
| 9  | 5  | 12 | 0  | 12 | 12 | 24 | 11 |
| 22 | 5  | 12 | 12 | 8  | 12 | 22 | 8  |
| 10 | 8  | 9  | 12 | 6  | 6  | 12 | 10 |
| 0  | 0  | 8  | 13 | 4  | 6  | 12 | 10 |
| 20 | 0  | 7  | 15 | 6  | 4  | 15 | 14 |
| 24 | 22 | 18 | 16 | 5  | 3  | 16 | 15 |
| 12 | 30 | 20 | 17 | 0  | 12 | 2  | 1  |

HEATMAP PROVIDING APPARATUS AND METHOD

CROSS-REFERENCE RELATED APPLICATION

This application claims priority from Korean Patent Application No. 10-2014-0000407, filed on Jan. 2, 2014, in the Korean Intellectual Property Office, the disclosure of which is incorporated herein in its entirety by reference.

BACKGROUND

1. Field

Apparatuses and methods consistent with exemplary embodiments relate to generating a heatmap and displaying an area of interest that is set from a full region.

2. Description of the Related Art

Analysis of a customer flow and customers' concern in a shop is important data for business/marketing decision making. Such data may be directly collected by an interview, a membership card, or a shop assistant or may be indirectly collected by a closed-circuit television (CCTV) camera, a sensor, or a cellular phone.

Thus, it is required to have a more convenient and robust system and method to analyze a customer flow and customers' degree of interest in a shop using an improved CCTV or equivalent devices.

SUMMARY

One or more exemplary embodiments of the inventive concept provide a heatmap providing apparatus and method, in which a heatmap is generated and displayed for an area of interest that is set from a full region.

Various aspects of the exemplary embodiments will be set forth in part in the description which follows and, in part, will be apparent from the description, or may be learned by practice of these embodiments.

According to an aspect of an exemplary embodiment, there is provided a heatmap providing method which may include: obtaining motion occurrence frequencies in a captured region; setting at least one area of interest in the captured region; and displaying the motion occurrence frequencies in different indications in the area of interest. The different indications may be different colors The heatmap providing method may further include dividing the captured region into a plurality of regions.

The heatmap providing method may further include establishing a database (DB) that cumulatively stores motion occurrence frequencies in the plurality of divided regions.

The displaying the motion occurrence frequencies may include: obtaining, from the DB, motion occurrence frequencies corresponding to the area of interest; setting priorities to the motion occurrence frequencies or regions, among the plurality of divided regions, having the motion occurrence frequencies, respectively, and corresponding to the area of interest; and assigning and displaying the different indications to the set priorities.

The setting at least one area of interest may include setting at least one time of interest for the at least one area of interest.

The displaying the motion occurrence frequencies may include: obtaining, from the DB, motion occurrence frequencies corresponding to the area of interest during the time of interest; setting priorities to the motion occurrence frequencies or regions, among the plurality of divided regions, having the motion occurrence frequencies, respectively, and corresponding to the area of interest; and assigning and displaying the different indications to the set priorities.

The setting at least one area of interest may include receiving setting of a plurality of areas of interest in the captured region.

The displaying the motion occurrence frequencies may include simultaneously displaying respective heatmaps generated for the plurality of areas of interest.

The setting at least one area of interest may include receiving setting of a plurality of times of interest for the area of interest.

The displaying the motion occurrence frequencies may include simultaneously displaying heatmaps generated for the area of interest for each of the plurality of times of interest.

According to an aspect of another exemplary embodiment, there is provided a heatmap providing apparatus which may include: a motion analyzer configured to obtain motion occurrence frequencies in a captured region; a UI configured to display the captured region and set at least one area of interest in the captured region; and a heatmap generator configured to assign different indications to a plurality of regions, divided from the captured region, having the motion occurrence frequencies, respectively, and corresponding to the area of interest, and output a result of the assigning to the UI.

The heatmap providing apparatus may further include a region divider configured to divide the captured region into the plurality of regions.

The heatmap providing apparatus may further include a DB configured to cumulatively store the motion occurrence frequencies in the plurality of divided regions.

The heatmap generator may obtain, from the DB, the motion occurrence frequencies corresponding to the area of interest, set priorities to the motion occurrence frequencies or regions, among the plurality of divided regions, having the motion occurrence frequencies, respectively, and corresponding to the area of interest, and assign and display the different indications to the set priorities.

The UI may set at least one time of interest for the at least one area of interest.

The heatmap generator may obtain, from the DB, the motion occurrence frequencies corresponding to the area of interest during the time of interest, set priorities to the motion occurrence frequencies or regions, among the plurality of divided regions, having the motion occurrence frequencies, respectively and corresponding to the area of interest, and assign and display the different indications to the set priorities.

The UI may set a plurality of areas of interest in the captured region.

The heatmap generator may simultaneously display respective heatmaps generated for the plurality of areas of interest.

The heatmap generator may set a plurality of times of interest for the area of interest.

The heatmap generator may simultaneously display heatmaps generated for the area of interest for each of the plurality of times of interest.

BRIEF DESCRIPTION OF THE DRAWINGS

These and/or other aspects will become apparent and more readily appreciated from the following description of the exemplary embodiments, taken in conjunction with the accompanying drawings, in which:

FIG. 2 illustrates an example in which the frequencies of occurrence of motion in a captured region or an area of interest are accumulated according to an exemplary embodiment;

DETAILED DESCRIPTION OF THE EXEMPLARY EMBODIMENTS

Figure 1:
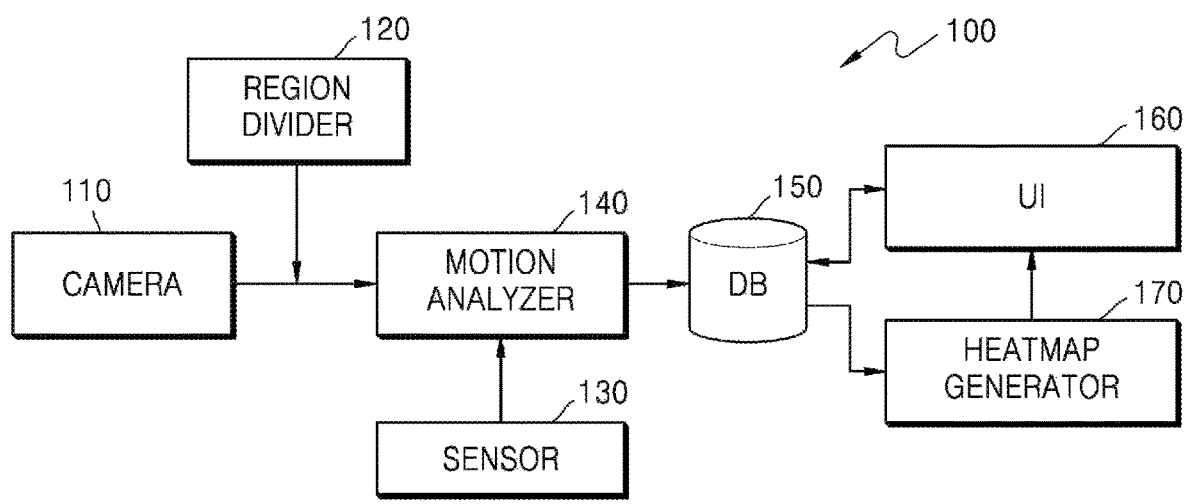
FIG. 1 is a block diagram illustrating a heatmap providing apparatus according to an exemplary embodiment.

Reference will now be made in detail to exemplary embodiments in reference to the accompanying drawings, wherein like reference numerals refer to like elements throughout. In this regard, the embodiments described herein may have different forms according to various situations and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, various embodiments will be described with reference to the accompanying drawings. In the following description, a detailed description of known functions and configurations incorporated herein will be omitted when it may obscure the subject matter of the inventive concept.

Although ordinal numbers such as "first," "second," and so forth will be used to describe various components, those components are not limited by the terms. The ordinal terms are used only for distinguishing one component from another component.

The terminology used herein is for the purpose of describing exemplary embodiments only and is not intended to be limiting. As used herein, the singular forms are intended to include plural forms as well, unless the context clearly indicates otherwise. It will be further understood that the terms "comprises" and/or "has" when used in present invention, specify the presence of a stated feature, number, step, operation, component, element, or a combination thereof but do not preclude the presence or addition of additional features, numbers, steps, operations, components, elements, or combinations thereof.

The exemplary embodiments may be described in terms of functional block components and various processing steps. Such functional blocks may be realized by any number of hardware, software and/or firmware components configured to perform the specified functions. For example, the exemplary embodiments may employ various integrated circuit components, e.g., memory elements, processing elements, logic elements, look-up tables, and the like, which may carry out a variety of functions under the control of one or more microprocessors or other control devices. Similarly, where the elements of the exemplary embodiments are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented with an algorithm executed in one or more processors. Furthermore, the present invention could employ conventional techniques for electronics configuration, signal processing and/or control, data processing, and the like. Terms such as "mechanism", "element", "means", "component", etc., may be used in a broad sense, and are not limited to mechanical and physical components. The terms may include a meaning of a series of routines of software in connection with a processor or the like.

Hereinafter, the exemplary embodiments will be described in detail with reference to the accompanying drawings, and in the description made with reference to the accompanying drawings, like reference numerals will be understood to refer to like parts, components, and structures, and a repetitive description will be avoided.

A heatmap is a representative way to visually indicate a flow and the degree of interest/complexity of a customer in a shop. The heatmap is a combination of 'heat' and a 'map', and the heatmap outputs various information that may be expressed in colors as visual graphics in the form of heat distribution on a predetermined image. The heatmap may express the degree of interest or complexity of customers on a camera image or a map through levels of colors. Motion of customers in a shop is accumulated for a predetermined unit time and is expressed in colors for display on an accumulation basis. For a region in which much motion of customers is detected, the region is expressed in a red based color, and for a region in which less motion of the customers is detected, the region is expressed in a blue-based color. A shop manager may visually recognize the distribution of motion of customers through the heatmap.

However, when a user who desires to the distribution of motion of the customers using a heatmap wants to see a heatmap for a partial area of interest instead of a full region, the heatmap of the area of interest may not be accurately generated.

FIG. 1 is a block diagram illustrating a heatmap providing apparatus according to an exemplary embodiment.

Referring to FIG. 1, a heatmap providing apparatus 100 may include a camera 110, a region divider 120, a sensor 130, a motion analyzer 140, a database (DB) 150, a user interface (UI) 160, and a heatmap generator 170.

The camera 110 may be a speed dome camera disposed in a fixed position of a particular place. The camera 110 may be a pan/tilt/zoom (PTZ) camera having a PTZ function. If the camera 110 is a PTZ camera, a live image of a particular place, which is obtained by the PTZ function, is generated and an image is continuously obtained during rotation of the body of the camera 110 in a fixed position by 0°-360° panning and 0°-90° tilting.

The image divider 120 divides a region captured by the camera 110 into a predetermined number of regions. The image divider 120 may divide the captured region in a various manner according to a camera setting. For example, the image divider 120 may divide the captured region into, for example, 5×5 regions, 10×10 regions, 20×20 regions, or the like. In FIGS. 3 to 6, division into 20×20 regions is illustrated as examples.

The sensor 130 senses motion data from the captured region to allow the image analyzer 140 to detect motion. Herein, the sensor 130 may include an image sensor, a laser sensor, a kinetic sensor, an infrared sensor, or the like.

If the sensor 130 is an image sensor (not illustrated), the camera 110 and the sensor 130 are integrated into one piece. The image sensor converts an optical signal of a subject, which has passed through a lens (not illustrated) of the camera 110, into an electric signal (an image signal) and outputs the electric signal, and may include a complementary metal-oxide semiconductor (CMOS) module or a charge coupled device (CCD) module. If the sensor 130 is a laser sensor (not illustrated), the laser sensor may include an oscillation unit (not illustrated) that oscillates a laser and a reception unit (not illustrated) that receives a laser reflected from an object. If the sensor 130 is a kinetic sensor (not illustrated), the kinetic sensor may include one RGB camera (not illustrated) and two infrared cameras (not illustrated). The RGB camera may obtain 32-bit data of a 640×480 resolution at a rate of 30 frames per second and the infrared camera may obtain 16-bit data of a 320×240 resolution at a rate of 30 frames per second. A depth value of an image may be calculated using the two infrared cameras, and object tracing may be possible using the RGB camera and the infrared cameras. If the sensor 130 is an infrared sensor (not illustrated), the infrared sensor may include a light-emission unit (not illustrated) that emits infrared rays and a light-reception unit (not illustrated) that receives infrared rays reflected from an object.

The motion analyzer 140 receives motion data regarding the captured region from the sensor 130 to detect motion and obtain a motion occurrence frequency. Herein, the motion analyzer 140 may perform motion analysis for a set predetermined unit time (for example, 1 second, 1 minute, 1 hour, 1 day, or the like) to obtain a motion occurrence frequency.

Upon sensing the motion data regarding the captured region from the image sensor, the motion analyzer 140 determines occurrence of motion through comparison between a previous image frame and a current image frame, and obtains and records a motion occurrence frequency in a motion-occurring divided region among the predetermined number of regions obtained by dividing the captured region. If receiving the motion data regarding the captured region from the laser sensor, the motion analyzer 140 oscillates the laser, counts a time until reception of the laser after reflection from an object to determine occurrence of motion, and obtains and records a motion occurrence frequency in a motion occurring divided region among the predetermined number of divided regions. If receiving the motion data regarding the captured region from the kinetic sensor, the motion analyzer 140 determines occurrence of motion through comparison between a previous image frame and a current image frame, and obtains and records a motion occurrence frequency in a motion-occurring divided region among the predetermined number of divided regions. If receiving the motion data regarding the captured region from the infrared sensor, the motion analyzer 140 emits infrared rays, counts a time until reception of the infrared rays after reflection from an object to determine occurrence of motion, and obtains and records a motion occurrence frequency in a motion-occurring divided region among the predetermined number of divided regions.

The DB 150 cumulatively stores the motion occurrence frequency in the divided region. FIG. 2 illustrates an example in which a motion occurrence frequency corresponding to a unit time in each of 8×8 regions obtained by dividing the captured region is cumulatively stored. Herein, a value recorded in each region indicates a motion occurrence frequency and a higher value means a higher motion occurrence frequency.

Figure 3:
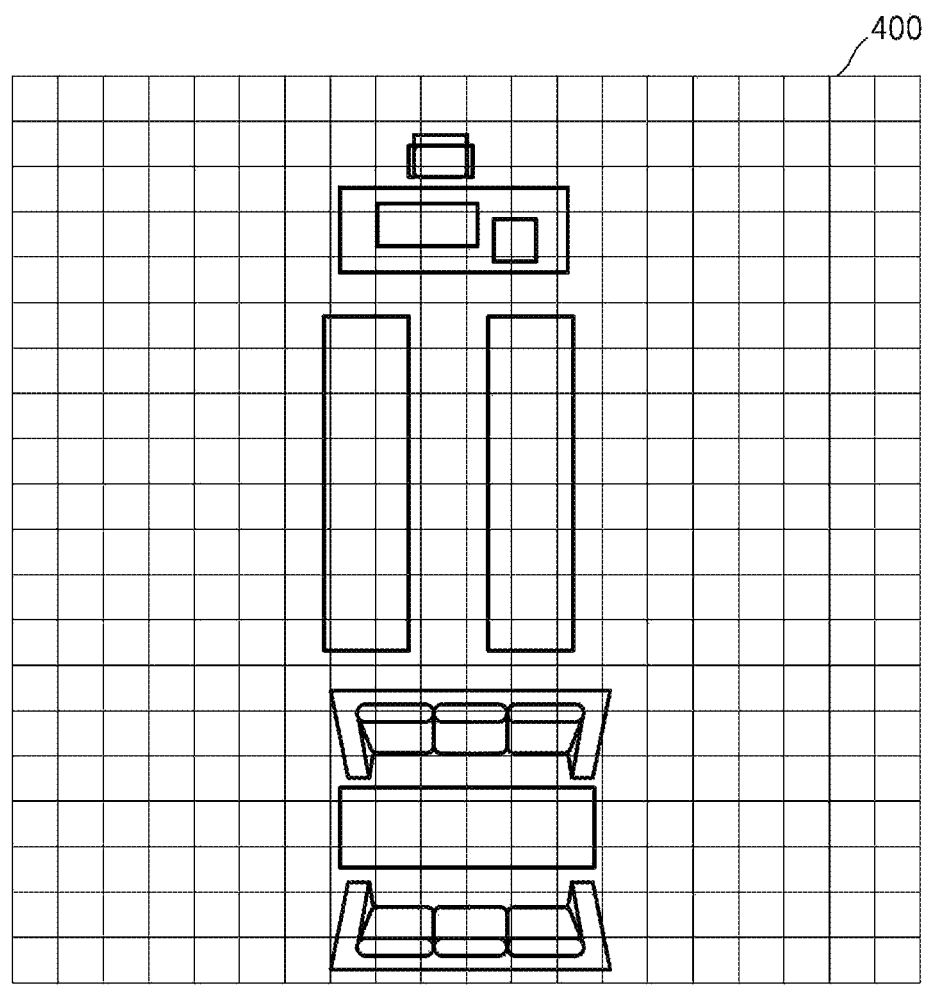
FIG. 3 illustrates a captured region divided into a predetermined number of regions according to an exemplary embodiment.

The user interface (UI) 160 displays a heatmap generation result for the full captured region. The UI 160 enables to set an area of interest and/or a time of interest from the full captured region, and displays a heatmap generation result for the set area of interest and/or time of interest. FIG. 3 shows the full captured region 400 divided into a predetermined number of regions, displayed on the UI 160. As another example, an area of interest (ROI) may be set in advance in the UI 160.

Figure 4A:
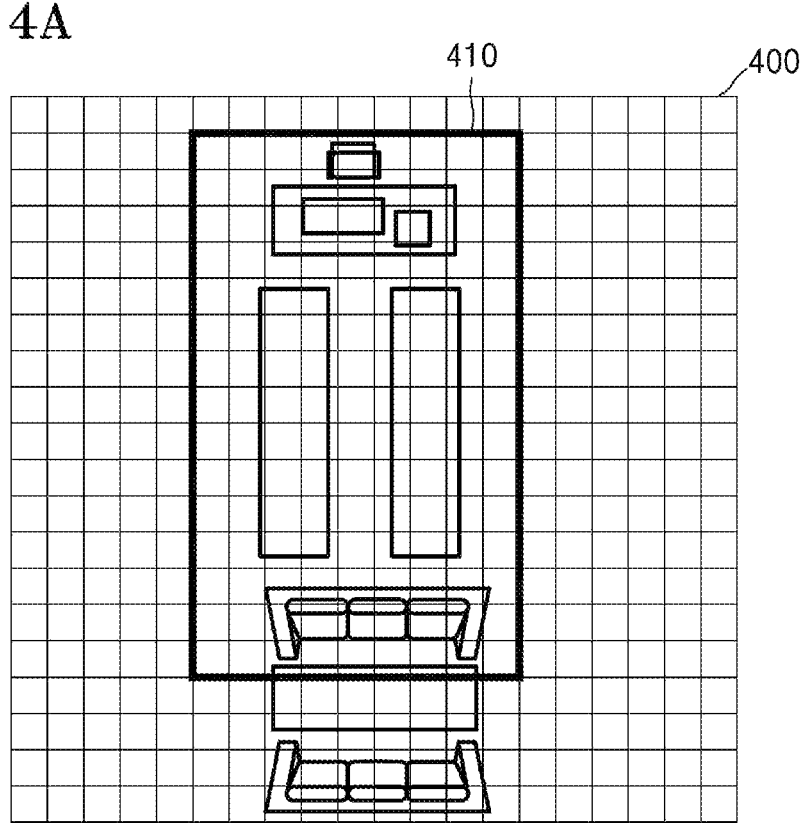
FIGS. 4A and 4B illustrate setting of an area of interest and generation of a heatmap for the area of interest according to an exemplary embodiment.
Figure 5A:
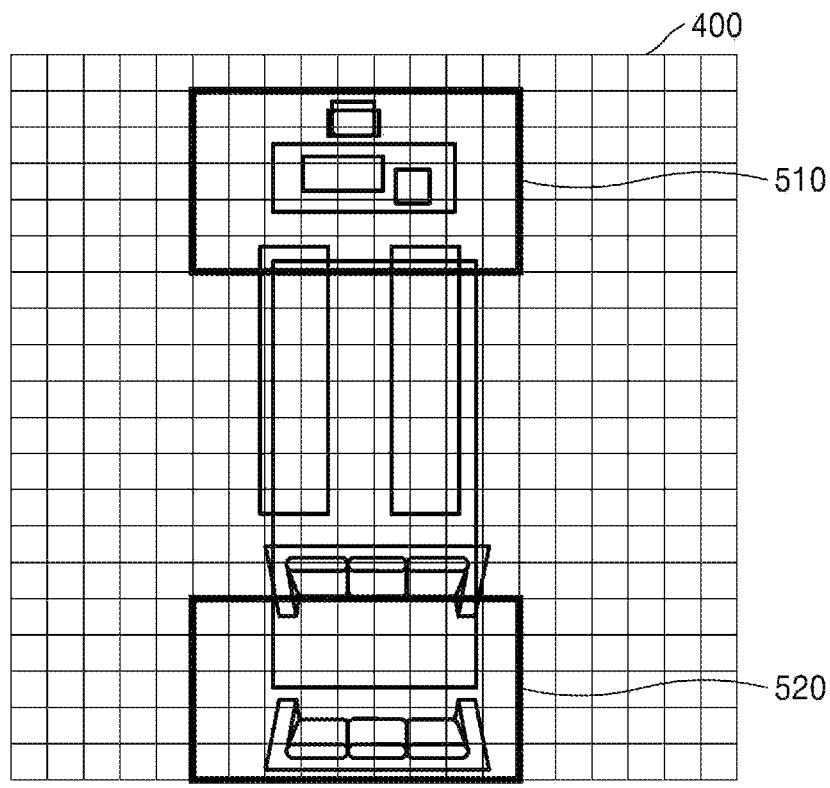
FIGS. 5A and 5B illustrate setting of a plurality of areas of interest and generation of a heatmap for the plurality of areas of interest according to an exemplary embodiment.

The UI 160 displays an area of interest set by a user from the captured region 400 illustrated in FIG. 3. Herein, at least one area of interest may be set. FIG. 4A illustrates an example in which one area of interest is set, and FIG. 5A illustrates an example in which two areas of interest are set from the same captured region. However, three or more areas of interest may also be set. The UI 160 may simultaneously display at least one heatmap generated for at least one set area of interest.

The UI 160 may set at least one time of interest for an area of interest. A plurality of times of interest may be set for one area of interest. For example, as illustrated in FIG. 6B, 11:00-12:00, 15:00-16:00, 18:00-19:00, and 21:00-22:00 may be set, and a user-desired time period may be set for at least one time of interest. The UI 160 may simultaneously display at least one heatmap generated for an area of interest during at least one time of interest.

The UI 160 may also set at least one time of interest for at least one area of interest. The UI 160 simultaneously display at least one heatmap generated for at least one area of interest during at least one time of interest.

The heatmap generator 170 obtains, from the DB 150, motion occurrence frequencies in at least one area of interest accumulated therein or motion occurrence frequencies in at least one area of interest corresponding to at least one set time of interest and accumulated therein, sets priorities to the motion occurrence frequencies or divided regions having the motion occurrence frequencies in the area of interest, assigns and displays different colors for the different priorities to generate a heatmap, and outputs the heatmap to the UI 160.

To be more specific as to heatmap generation, assuming that eight (8) colors are assigned, the heatmap generator 170 sets first through eighth priorities to motion occurrence frequencies or divided regions having respective motion occurrence frequencies in the area of interest and assigns a first color, for example, red, to the first priority, a second color, for example, blue, to the eighth priority, and colors varying from red to blue to the second through seventh priorities.

In another way, the heatmap generator 170 sets a maximum value corresponding to the highest motion occurrence frequency or a divided region having the highest motion occurrence frequency in the area of interest and a minimum value corresponding to the lowest motion occurrence frequency or a divided region having the lowest motion occurrence frequency in the area of interest, which are obtained from the DB 150, and assigns a first color to the maximum value or at least one divided region having the maximum value and a second color to the minimum value or at least one divided region having the minimum value. A region corresponding to a value between the maximum value and the minimum value may be uniformly divided or a weight value may be applied to a particular frequency, such that a red-based color other than the first color may be assigned to a divided region close to the maximum value and a blue-based color other than the second color may be assigned to a divided region close to the minimum value. According to another exemplary embodiment, a different type of indication or marking may be applied to different priority regions or frequencies, instead of color.

Figure 4B:
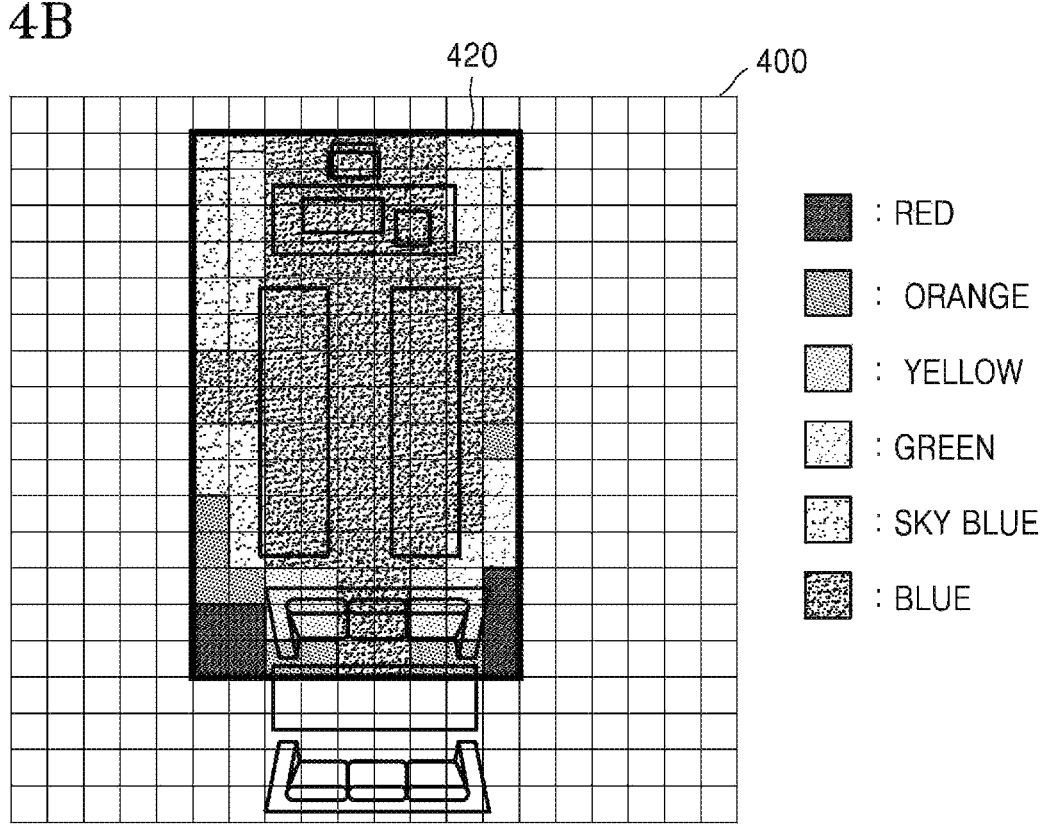

FIGS. 4A and 4B illustrate setting of an area of interest and generation of a heatmap for the area of interest according to an exemplary embodiment. Referring to FIG. 4B, the heatmap generator 170 displays a heatmap generation result 420 for an area of interest 410, set within the full captured region 400 in the UI 160 as illustrated in FIG. 4A.

Figure 5B:
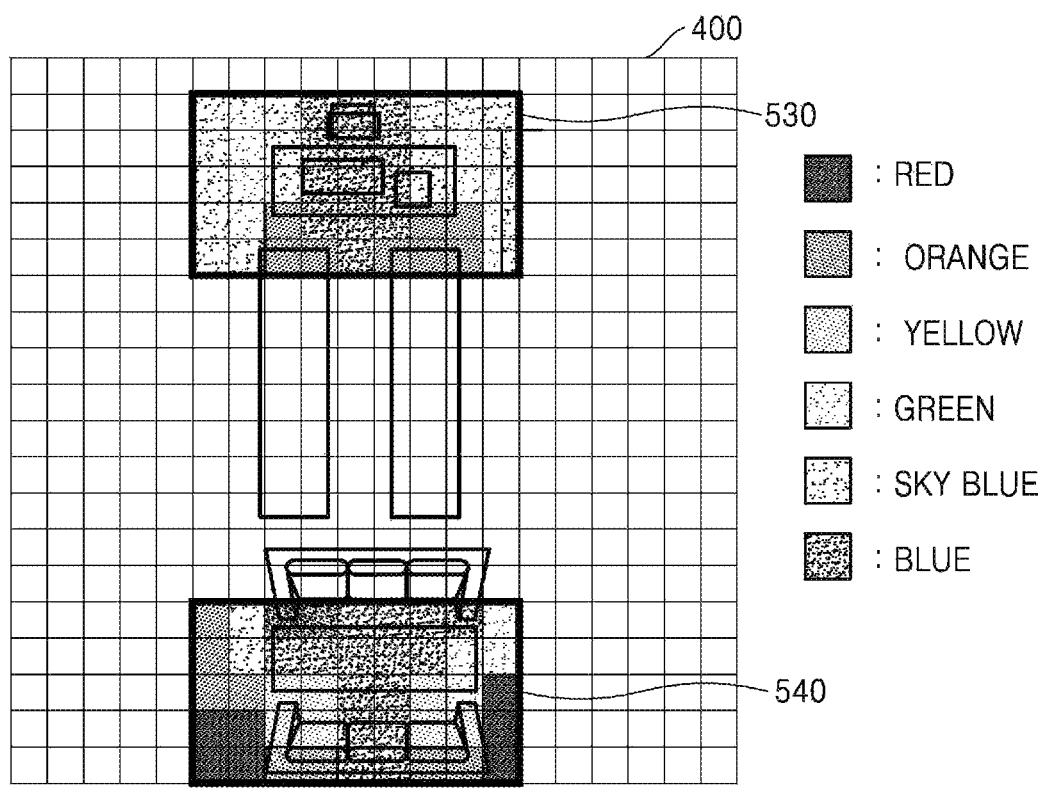

FIGS. 5A and 5B illustrate setting of a plurality of areas of interest and generation of a heatmap for the plurality of areas of interest according to an exemplary embodiment. Referring to FIG. 5B, the heatmap generator displays a heatmap generation result 530 and a second heatmap generation result 540 for a first area of interest 510 and a second area of interest 520, respectively, which are set within the full captured region 400 in the UI 160 as illustrated in FIG. 5A.

Figure 6A:
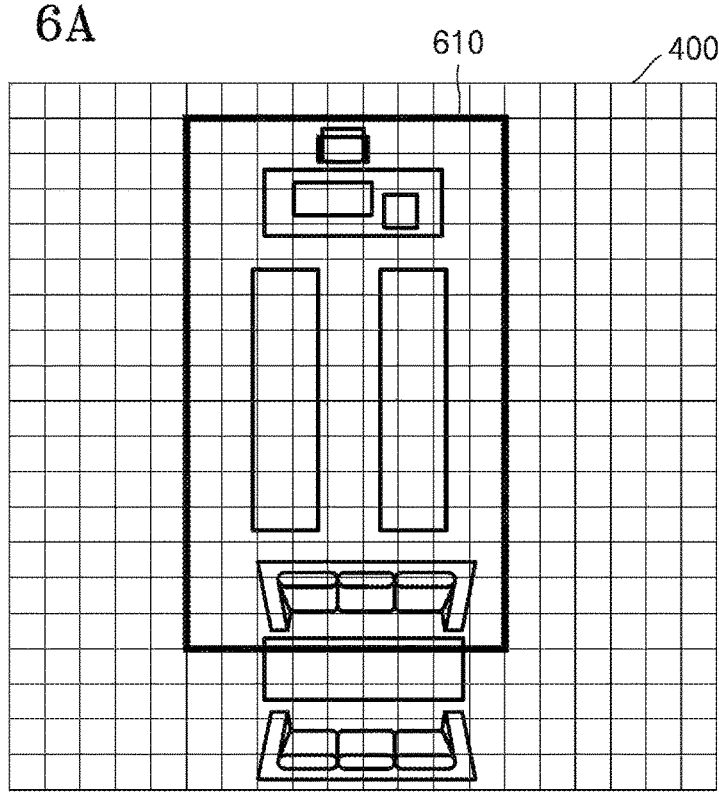
FIGS. 6A and 6B illustrate setting of a plurality of times of interest for an area of interest and generation of a heatmap for the area of interest on a time of interest basis according to an exemplary embodiment.
Figure 6B:
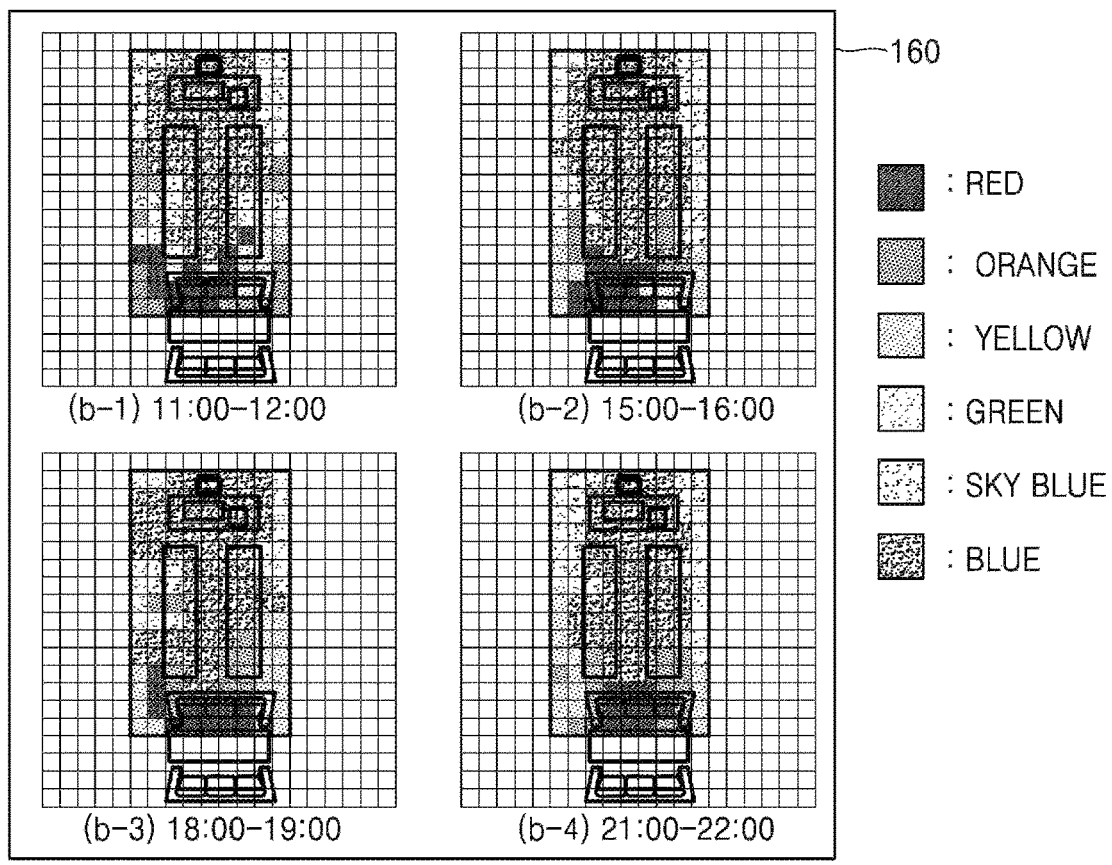

FIGS. 6A and 6B illustrate setting of a plurality of times of interest for an area of interest and generation of a heatmap for the area of interest for each time of interest according to an exemplary embodiment. Referring to FIG. 6A, the heatmap generator 170 displays first through fourth heatmap generation results (b-1) to (b-4) as illustrated FIG. 6B for times of interest, 11:00-12:00, 15:00-16:00, 18:00-19:00, and 21:00-22:00 and an area of interest 610, which are set within the full captured region 400 in the UI 160 as illustrated in FIG. 6A.

FIG. 7 illustrates a setting of an ROI and generation of a heatmap for the ROI according to an exemplary embodiment.

Figure 7A:
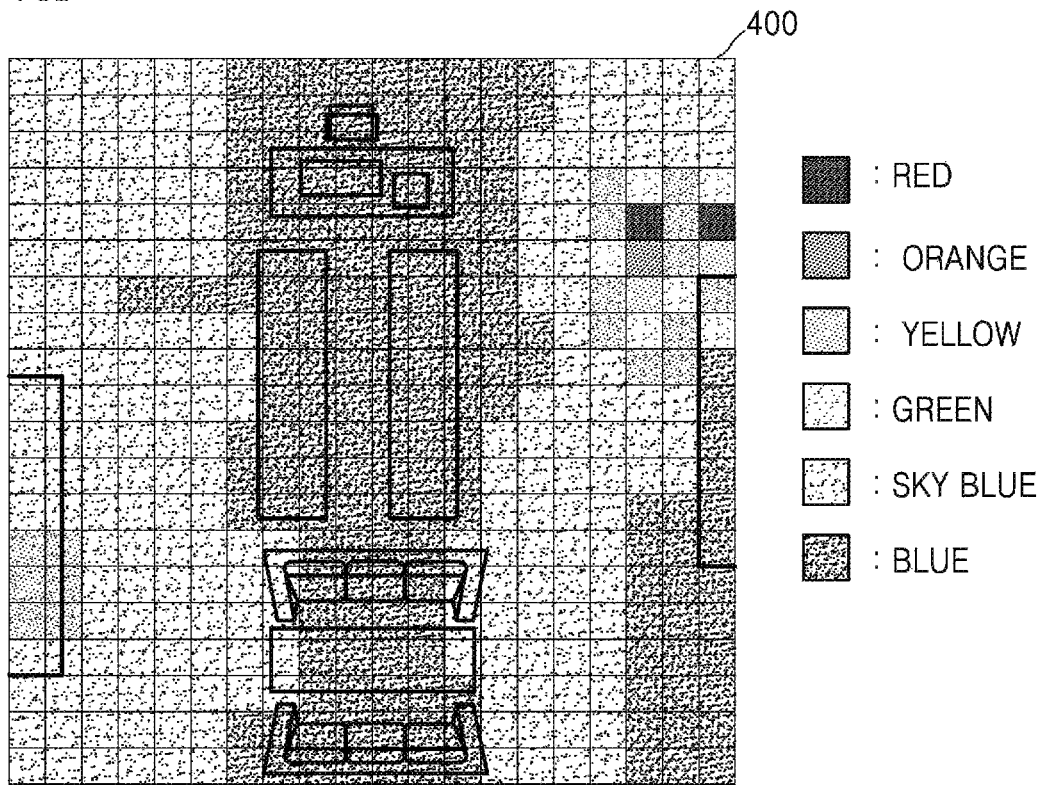
FIGS. 7A to 7D illustrate setting of an ROI and generation of a heatmap for the ROI according to an exemplary embodiment.
Figure 7B:
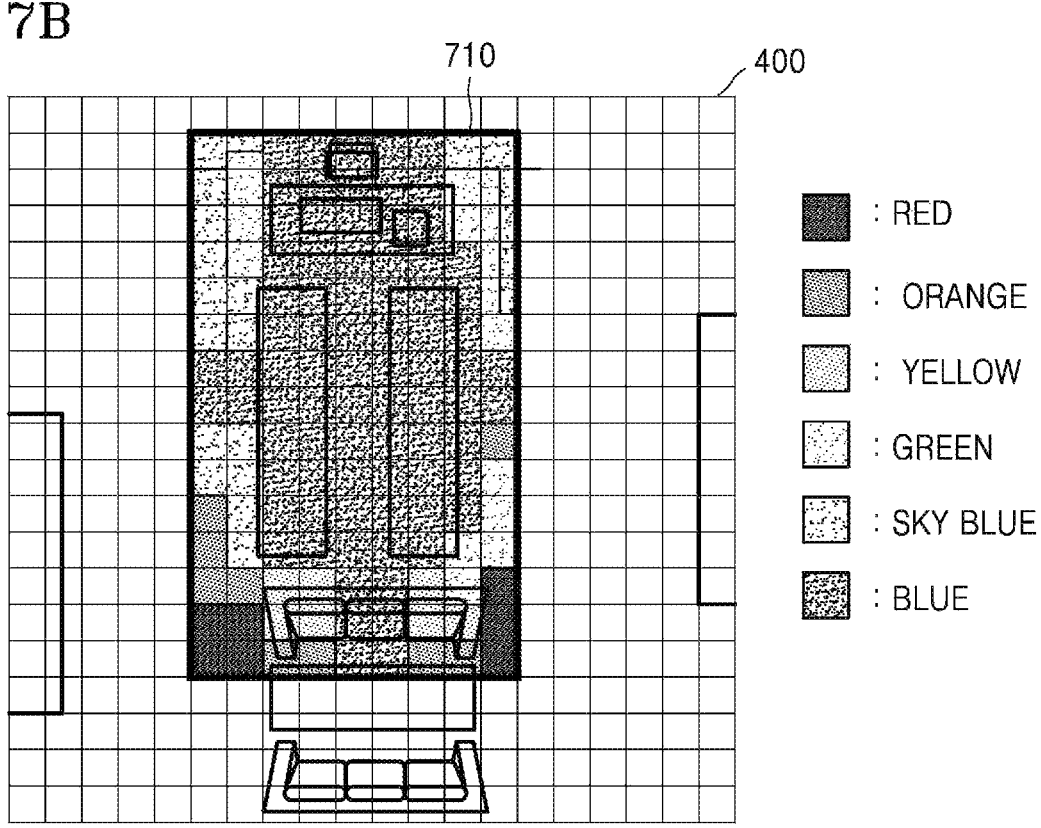
Figure 7C:
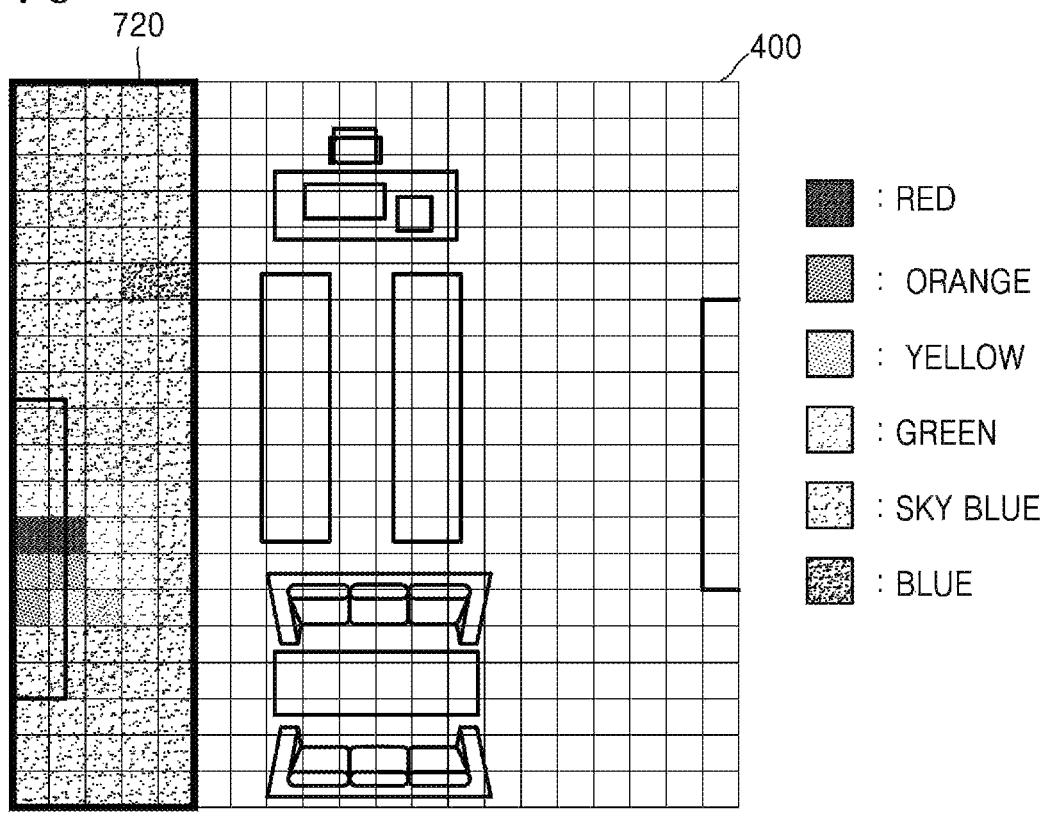
Figure 7D:
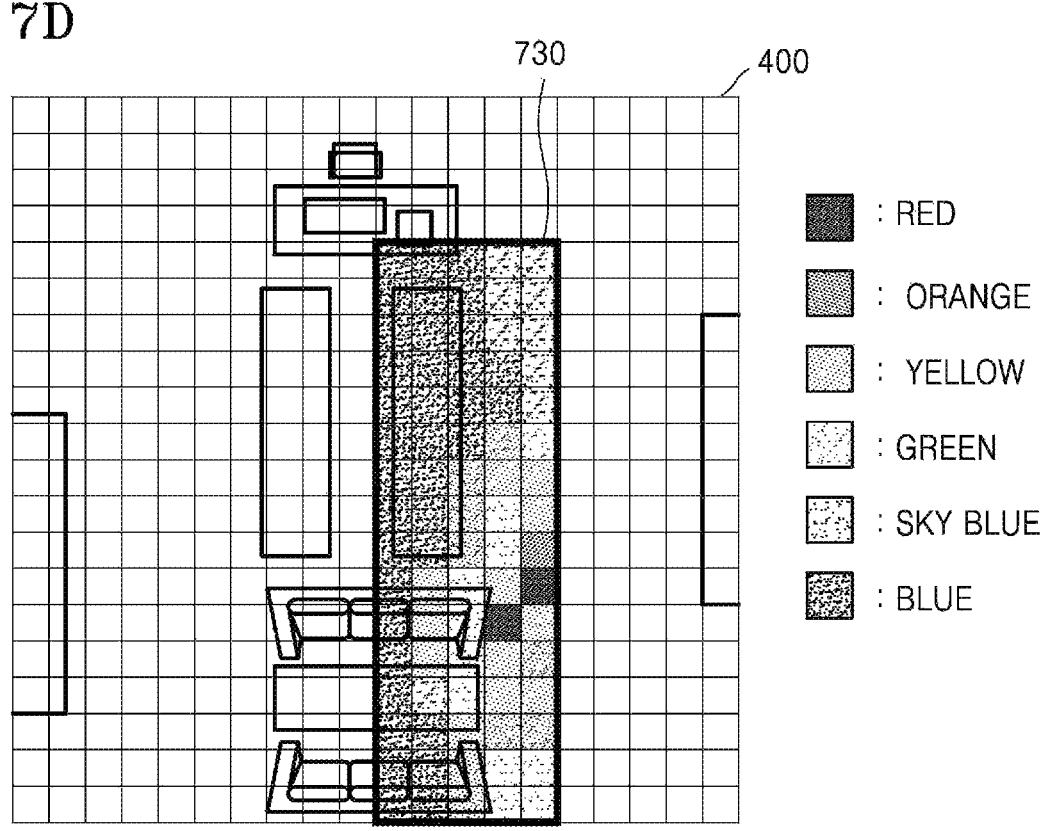

As illustrated in FIG. 7A, the heatmap generator 170 may display a heatmap generation result for the full capture region 400 on the user interface 160. As illustrated in FIGS. 7B to 7D, if ROIs 710, 720, and 730 are set within the full captured region 400 in the user interface 160, the heatmap generator 170 regenerates a heatmap for the ROIs 710, 720, and 730, respectively and displays the heatmap regeneration result on the user interface 160. Referring to FIGS. 7B to 7D, the heatmap for the ROIs 710, 720, and 730 overlaps with the full captured region 400. In another embodiment, the heatmap for the ROIs 710, 720, and 730 may overlap with the heatmap for the full captured region 400.

For example, as the FIG. 7A, the heatmap generator 170 may set the priorities to the motion occurrence frequency of the full captured region 400 based on the DB 150 of the FIG. 2. The heatmap generator 170 may assign colors to the respective priorities and thereby generate a heatmap for the full captured region 400. The heatmap generator 170 may reset the priorities for the motion occurrence frequency within respective set ROIs 710, 720, and 730 based on the DB 150 of the FIG. 2, assign colors to the reset priorities and thereby generate a heatmap for each of the ROIs 710, 720, and 730. As illustrated in FIGS. 7B to 7D, different ROI heatmaps have different color assignments depending on the ROI.

Namely, the color distribution to the heatmap for the ROIs 710, 720, and 730 may become more detailed compared to the heatmap for the full captured region 400. As such, by generating and displaying a heatmap for an area of interest set from a full region and/or a time of interest, the accuracy of the heatmap for the area of interest with respect to a heatmap for the full region may be improved.

Now a description will be given of a heatmap providing method according to an exemplary embodiment with reference to FIG. 8. The heatmap providing method according to the present embodiment may be performed by the heatmap providing apparatus 100 with the help of peripheral components as illustrated in FIG. 1. In the following description, the same parts as described in FIGS. 1 to 6B will not be described again.

Figure 8:
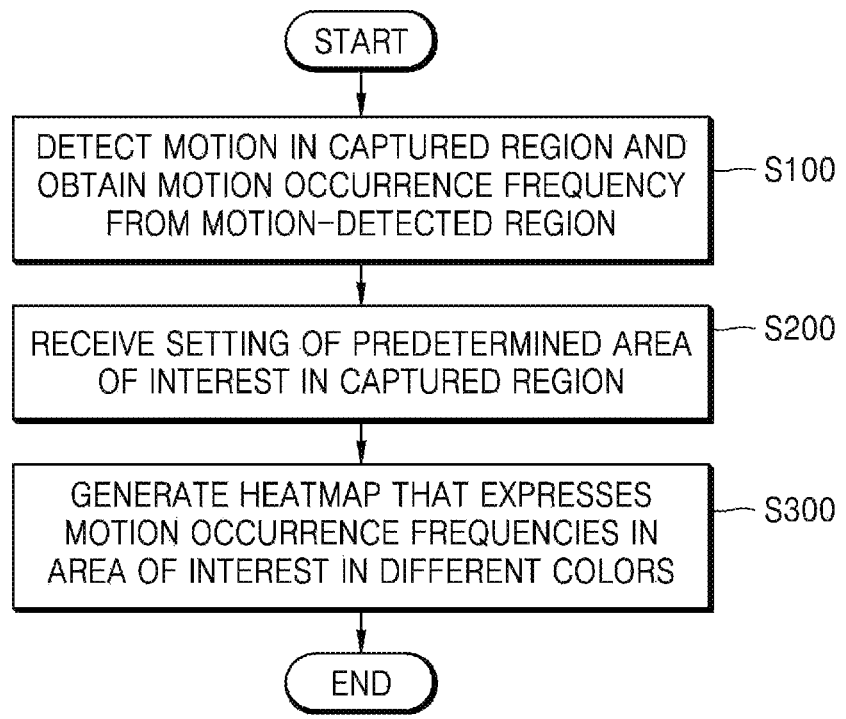
FIG. 8 is a flowchart illustrating a heatmap providing method according to an exemplary embodiment.

Referring to FIG. 8, the heatmap providing apparatus 100 detects motion in a captured region and obtains a motion occurrence frequency from a motion-detected region in operation S100. Prior to operation S100, the heatmap providing apparatus 100 may divide the captured region into a predetermined number of regions. The heatmap providing apparatus 100 may receive data from an image sensor, a laser sensor, a kinetic sensor, or an infrared sensor to detect motion and obtain a motion occurrence frequency. Herein, the heatmap providing apparatus 100 may obtain a motion occurrence frequency by performing motion analysis during a set unit time. If motion data regarding the captured region is received from the image sensor, occurrence of motion may be determined by comparison between a previous image frame and a current image frame, and a motion occurrence frequency may be obtained for a divided region in which motion occurs among a predetermined number of regions obtained by dividing the captured region. If motion data regarding the captured region is received from the laser sensor, a laser may be oscillated and a time until reception of the laser after reflection may be counted to determine occurrence of motion, and a motion occurrence frequency may be obtained for a divided region where motion occurs among the predetermined number of divided regions. If motion data regarding the captured region is received from the kinetic sensor, occurrence of motion may be determined by comparison between a previous image frame and a current image frame, and a motion occurrence frequency may be obtained for a divided region where motion occurs among the predetermined number of divided regions. If motion data regarding the captured region is received from the infrared sensor, infrared rays may be emitted and a time until reception of the infrared rays after reflection from an object may be counted to determine occurrence of motion, and a motion occurrence frequency may be obtained for a divided region where motion occurs among the predetermined number of divided regions. Thereafter, the heatmap providing apparatus 100 cumulatively stores the motion occurrence frequency of the divided region in a DB.

The heatmap providing apparatus 100 receives setting of a predetermined area of interest in the captured region from the user in operation S200. The heatmap providing apparatus 100 may receive setting of at least one area of interest from the user. The heatmap providing apparatus 100 may receive setting of at least one time of interest for an area of interest from the user. The heatmap providing apparatus 100 may further receive setting of at least one time of interest for at least one area of interest from the user.

The heatmap providing apparatus 100 generates a heatmap that expresses motion occurrence frequencies in an area of interest and/or a time of interest set by the user in different colors, and provides the heatmap to the user in operation S300. The heatmap providing apparatus 100 obtains, from a DB, motion occurrence frequencies in at least one area of interest accumulated therein or motion occurrence frequencies in at least one area of interest corresponding to at least one set time of interest and accumulated therein, sets priorities to the motion occurrence frequencies or divided regions having the motion occurrence frequencies in an area of interest, assigns and displays different colors for the different priorities to generate a heatmap, and outputs the heatmap to the user. Assuming that eight (8) colors are assigned, the heatmap providing apparatus 100 sets first through eighth priorities to motion occurrence frequencies or divided regions having the motion occurrence frequencies in an area of interest and assigns a first color, for example, red, to the first priority, a second color, for example, blue, to the eighth priority, and colors varying from red to blue to the second through seventh priorities. The heatmap providing apparatus 100 sets a maximum value corresponding to the highest motion occurrence frequency in the area of interest and a minimum value corresponding to the lowest motion occurrence frequency in the area of interest, which are obtained from the DB, and assigns a first color to the maximum value or at least one divided region having the maximum value and a second color to the minimum value or at least one divided region having the minimum value. A region corresponding to a value between the maximum value and the minimum value may be uniformly divided or a weight value may be applied to a particular frequency, such that a red-based color other than the first color may be assigned to a divided region close to the maximum value and a blue-based color other than the second color may be assigned to a divided region close to the minimum value.

According to another exemplary embodiment, the heatmap providing method may have a different order of operations compared to the embodiment described above in reference to FIG. 8. For example, setting of a predetermined area of interest and/or time of interest in the captured region may be received from the user before motion is detected in the capture region and motion occurrence frequencies are obtained. Further, motion detection and obtaining data of motion occurrence frequencies may be performed only on the predetermined area of interest and/or time of interest.

The heatmap providing apparatus 100 may provide a heatmap generation result for a user-set area of interest to the user. The heatmap providing apparatus 100 may simultaneously provide a plurality of heatmap generation results for a plurality of user-set areas of interest to the user. The heatmap providing apparatus 100 may also set a plurality of times of interest for an area of interest and simultaneously provide a plurality of heatmap generation results for the area of interest for the respective times of interest to the user.

As described above, according to the one or more exemplary embodiments, a heatmap may be generated and displayed for an area of interest that is set from a full region, thereby improving the accuracy of the heatmap for the area of interest with respect to a heatmap for a full region.

The above exemplary embodiments may be embodied as a computer-readable code on a computer-readable recording medium. The computer-readable recording medium is any data storage device that can store data which can be thereafter read by a computer system.

Examples of computer-readable recording media include read-only memory (ROM), random-access memory (RAM), CD-ROMs, magnetic tapes, floppy disks, optical data storage devices, etc. The computer-readable recording medium may also be distributed over network-coupled computer systems so that the computer-readable code is stored and executed in a decentralized fashion. Also, functional programs, code, and code segments for implementing the exemplary embodiments can be easily construed by programmers of ordinary skill in the art.

It should be understood that the exemplary embodiments described above should be considered in a descriptive sense only and not for purposes of limitation. Descriptions of features or aspects within these embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the inventive concept as defined by the following claims.

The invention claimed is:

1. A heatmap providing method, comprising:
dividing an image captured by a camera into a plurality of regions;
accumulating respective motion occurrence frequencies of the plurality of regions in a database;
receiving an area of interest inputted via a user interface (UI), the area of interest being a sub-image within the image, and the area of interest comprising regions from among the plurality of regions that are within the area of interest;
obtaining motion occurrence frequencies of the regions within the area of interest from the database;
assigning priorities to the motion occurrence frequencies of the regions within the area of interest,
wherein there are a predetermined number of the priorities ranging from a highest priority to a lowest priority for distributing within the captured image, and the predetermined number of the priorities are distributed within the area of interest to the motion occurrence frequencies obtained within the area of interest; and
generating a heatmap of the area of interest by assigning different color values to the priorities.

2. The heatmap providing method of claim 1, further comprising displaying the heatmap of the area of interest on the image captured by the camera.

3. The heatmap providing method of claim 1, wherein the highest priority is set to a first set of one or more of the highest motion occurrence frequencies within the area of interest, the lowest priority is set to a second set of one or more of the lowest motion occurrence frequencies within the area of interest, and remaining priorities from among the predetermined number of the priorities are uniformly divided or weight value divided to motion occurrence frequencies between the highest motion occurrence frequency and the lowest motion occurrence frequency.

4. The heatmap providing method of claim 1, further comprising:
assigning the predetermined number of priorities to the motion occurrence frequencies of the entire captured image, and generating a heatmap of the entire captured image by assigning different color values to the different priorities, and
wherein:
assigning priorities to the motion occurrence frequencies of the regions within the area of interest comprises reallocating the predetermined number of priorities to the motion occurrence frequencies of the regions within the area of interest such that the predetermined number of the priorities are distributed within the area of interest to the motion occurrence frequencies obtained within the area of interest; and generating the heatmap of the area of interest comprises regenerating the heatmap of the area of interest by assigning the different color values to the reallocated priorities.

5. The heatmap providing method of claim 4, further comprising:
displaying, on the UI, the heatmap of the entire captured image and the regenerated heatmap of the area of interest such that the regenerated heatmap of the area of interest overlaps the heatmap of the entire captured image.

6. The heatmap providing method of claim 1, wherein:
receiving an area of interest inputted via a user interface (UI) includes receiving two or more areas of interest including a first area of interest and a second area of interest;
assigning priorities to the motion occurrence frequencies of the regions within the area of interest comprises assigning the priorities to the motion occurrence frequencies of the regions within the first area of interest and assigning the priorities to the motion occurrence frequencies of the regions within the second area of interest such that the predetermined number of the priorities are distributed within the first area of interest to the motion occurrence frequencies within the first area of interest and the predetermined number of the priorities are distributed within the second area of interest to the motion occurrence frequencies within the second area of interest; and
generating the heatmap of the area of interest comprises generating a heatmap of the first area of interest and a heatmap of the second area of interest by assigning different color values to the priorities and simultaneously displaying the heatmap of the first area of interest and the heatmap of the second area of interest.

7. The heatmap providing method of claim 1, further comprising:
receiving a time of interest for the area of interest, the time of interest being a unit of time between a first point of time and a second point of time,
wherein obtaining motion occurrence frequencies of the regions within the area of interest from the database comprises obtaining motion occurrence frequencies of the regions within the area of interest during the time of interest from the database.

8. The heatmap providing method of claim 7, wherein:
receiving a time of interest for the area of interest comprises receiving two or more times of interest for the area of interest, the two or more times of interest including a first time of interest and a second time of interest;
obtaining motion occurrence frequencies of the regions within the area of interest from the database comprises obtaining motion occurrence frequencies of the regions within the area of interest during the first time of interest from the database and obtaining motion occurrence frequencies of the regions within the area of interest during the second time of interest from the database;
assigning priorities to the motion occurrence frequencies of the regions within the area of interest comprises assigning priorities to the motion occurrence frequencies of the regions within the area of interest during the first time of interest and assigning priorities to the motion occurrence frequencies of the regions within the area of interest during the second time of interest such that the predetermined number of the priorities are distributed within the area of interest to the motion occurrence frequencies obtained within the area of interest during the first time of interest and the predetermined number of the priorities are distributed within the area of interest to the motion occurrence frequencies obtained within the area of interest during the second period of interest; and
generating the heatmap of the area of interest comprises generating the heatmap of the area of interest during the first time of interest and the heatmap of the area of interest during the second time of interest by assigning different color values to the priorities and simultaneously displaying the heatmap of the first time of interest and the heatmap of the second time of interest.

9. A heatmap providing apparatus comprising:
a region divider configured to divide an image captured by a camera into a plurality of regions;
a motion analyzer configured to obtain respective motion occurrence frequencies of the plurality of regions;
a database configured to accumulate the respective motion occurrence frequencies of the plurality of regions;
a user interface (UI) configured to receive an area of interest, the area of interest being a sub-image within the image, and the area of interest comprising regions from among the plurality of regions that are within the area of interest;
a heatmap generator configured to:
assign a predetermined number of priorities ranging from a highest priority to a lowest priority to the image; and
when an area of interest is received,
obtain, from the database, motion occurrence frequencies of the regions within the area of interest;
assign the predetermined number of priorities to the motion occurrence frequencies of the regions within the area of interest, such that the predetermined number of the priorities are distributed within the area of interest to the motion occurrence frequencies obtained within the area of interest; and
generate a heatmap of the area of interest by assigning different color values to the different priorities,
wherein the UI is further configured to display the heatmap of the area of interest within the image captured by the camera.

10. The heatmap providing apparatus of claim 9, wherein the highest priority is set to a first set of one or more of the highest motion occurrence frequencies within the area of interest, the lowest priority is set to a second set of one or more of the lowest motion occurrence frequencies within the area of interest, and remaining priorities from among the predetermined number of the priorities are uniformly divided or weight value divided to motion occurrence frequencies between the highest motion occurrence frequency and the lowest motion occurrence frequency.

11. The heatmap providing apparatus of claim 9, wherein the heatmap generator is further configured to:
assign the predetermined number of priorities to the motion occurrence frequencies of the entire captured image, and generate a heatmap of the entire captured image by assigning different color values to the different priorities;
reallocate the predetermined number of priorities to the motion occurrence frequencies of the regions within the area of interest such that the predetermined number of the priorities are distributed within the area of interest to the motion occurrence frequencies obtained within the area of interest; and
regenerate the heatmap of the area of interest by assigning the different color values to the reallocated priorities.

12. The heatmap providing apparatus of claim 11, wherein the UI is further configured to display the heatmap of the entire captured image and the regenerated heatmap of the area of interest such that the regenerated heatmap of the area of interest overlaps the heatmap of the entire captured image.

13. The heatmap providing apparatus of claim 9, wherein:
the UI is further configured to receive two or more areas of interest including a first area of interest and a second area of interest; and
the heatmap generator is further configured to:
  assign the priorities to the motion occurrence frequencies of the regions within the first area of interest and assign the priorities to the motion occurrence frequencies of the regions within the second area of interest such that the predetermined number of the priorities are distributed within the first area of interest to the motion occurrence frequencies within the first area of interest and the predetermined number of the priorities are distributed within the second area of interest to the motion occurrence frequencies within the second area of interest; and
  generate a heatmap of the first area of interest and a heatmap of the second area of interest by assigning different color values to the priorities; and
the UI is further configured to simultaneously display the heatmap of the first area of interest and the heatmap of the second area of interest.

14. The heatmap providing apparatus of claim 9, wherein:
the UI is further configured to receive a time of interest for the area of interest, the time of interest being a unit of time between a first point of time and a second point of time; and
the heatmap generator is further configured to obtain motion occurrence frequencies of the regions within the area of interest during the time of interest from the database.

15. The heatmap providing apparatus of claim 9, wherein:
the UI is further configured to receive two or more times of interest for the area of interest, the two or more times of interest including a first time of interest and a second time of interest;
the heatmap generator is further configured to:
  obtain motion occurrence frequencies of the regions within the area of interest during the first time of interest from the database and obtain motion occurrence frequencies of the regions within the area of interest during the second time of interest from the database;
  assign priorities to the motion occurrence frequencies of the regions within the area of interest during the first time of interest and assign priorities to the motion occurrence frequencies of the regions within the area of interest during the second time of interest such that the predetermined number of the priorities are distributed within the area of interest to the motion occurrence frequencies obtained within the area of interest during the first time of interest and the predetermined number of the priorities are distributed within the area of interest to the motion occurrence frequencies obtained within the area of interest during the second period of interest;
  generate the heatmap of the area of interest during the first time of interest and the heatmap of the area of interest during the second time of interest by assigning different color values to the priorities; and
the UI is further configured to simultaneously display the heatmap of the first time of interest and the heatmap of the second time of interest.

16. A heatmap providing method, comprising:
dividing an image captured by a camera into a plurality of regions;
accumulating respective motion occurrence frequencies of the plurality of regions in a database;
receiving an area of interest inputted via a user interface (UI), the area of interest being a sub-image within the image, and the area of interest comprising regions from among the plurality of regions that are within the area of interest;
obtaining motion occurrence frequencies of the regions within the area of interest from the database;
assigning different priorities to the motion occurrence frequencies of the regions within the area of interest;
generate a heatmap of the area of interest by assigning different color values to the different priorities; and
displaying the heatmap of the area of interest on the image captured by the camera.

17. The heatmap providing method of claim 16, further comprising:
assigning the different priorities to the motion occurrence frequencies of the entire captured image, and generating a heatmap of the entire captured image by assigning different color values to the different priorities, and
wherein:
  assigning different priorities to the motion occurrence frequencies of the regions within the area of interest comprises reallocating the different priorities to the motion occurrence frequencies of the regions within the area of interest; and
  generating the heatmap of the area of interest comprises regenerating the heatmap of the area of interest by assigning the different color values to the reallocated priorities.

18. The heatmap providing method of claim 16, wherein:
receiving an area of interest inputted via a user interface (UI) includes receiving two or more areas of interest including a first area of interest and a second area of interest;
assigning different priorities to the motion occurrence frequencies of the regions within the area of interest comprises reallocating the different priorities to the motion occurrence frequencies of the regions within the area of interest; and
generating the heatmap of the area of interest comprises generating a heatmap of the first area of interest and a heatmap of the second area of interest by assigning different color values to the different priorities and simultaneously displaying the heatmap of the first area of interest and the heatmap of the second area of interest.

19. The heatmap providing method of claim 16, further comprising:
receiving a time of interest for the area of interest, the time of interest being a unit of time between a first point of time and a second point of time,
wherein obtaining motion occurrence frequencies of the regions within the area of interest from the database comprises obtaining motion occurrence frequencies of the regions within the area of interest during the time of interest from the database.

20. The heatmap providing method of claim 19, wherein:
receiving a time of interest for the area of interest comprises receiving two or more times of interest for the area of interest, the two or more times of interest including a first time of interest and a second time of interest;
obtaining motion occurrence frequencies of the regions within the area of interest from the database comprises obtaining motion occurrence frequencies of the regions within the area of interest during the first time of interest from the database and obtaining motion occurrence frequencies of the regions within the area of interest during the second time of interest from the database;
assigning different priorities to the motion occurrence frequencies of the regions within the area of interest comprises assigning the different priorities to the motion occurrence frequencies of the regions within the area of interest during the first time of interest and assigning the different priorities to the motion occurrence frequencies of the regions within the area of interest during the second time of interest; and
generating the heatmap of the area of interest comprises generating the heatmap of the area of interest during the first time of interest and the heatmap of the area of interest during the second time of interest by assigning different color values to the different priorities and simultaneously displaying the heatmap of the first time of interest and the heatmap of the second time of interest.

* * * * *